Aug. 27, 1957 F. E. HOLLAND 2,804,009
FOOD CONTAINER AND DISPENSER
Filed June 8, 1956 2 Sheets-Sheet 1
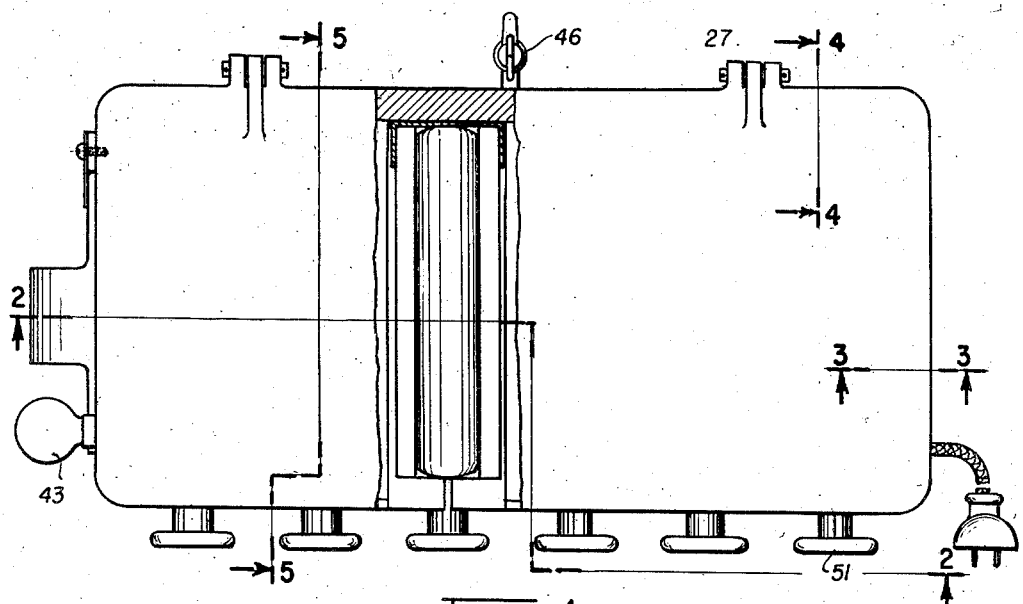
Fig-1
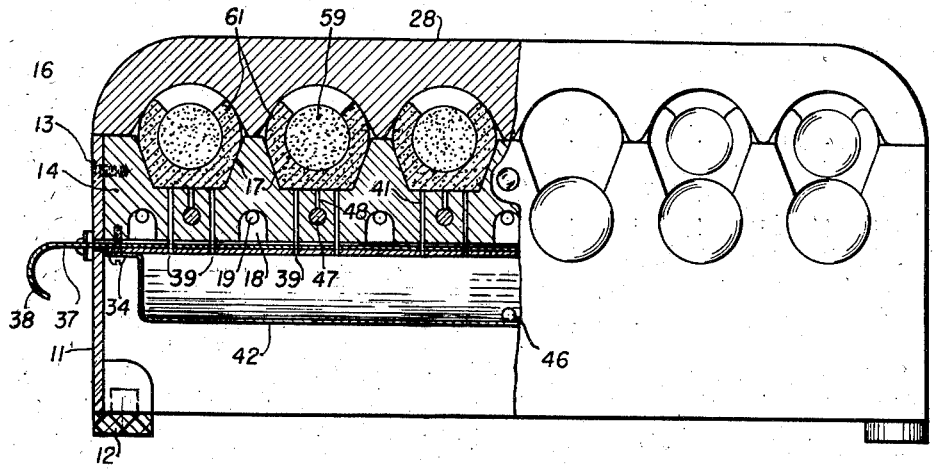
Fig-2
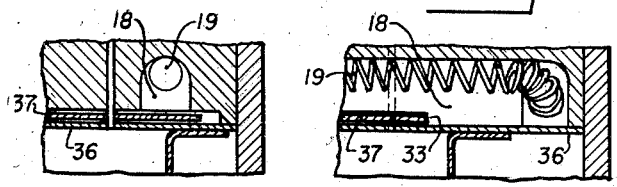
Fig-3 Fig 4
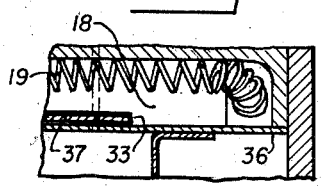
Florence E. Holland
INVENTOR.
BY Louis Capr
attorney Aug. 27, 1957  F. E. HOLLAND  2,804,009
FOOD CONTAINER AND DISPENSER
Filed June 8, 1956  2 Sheets-Sheet 2
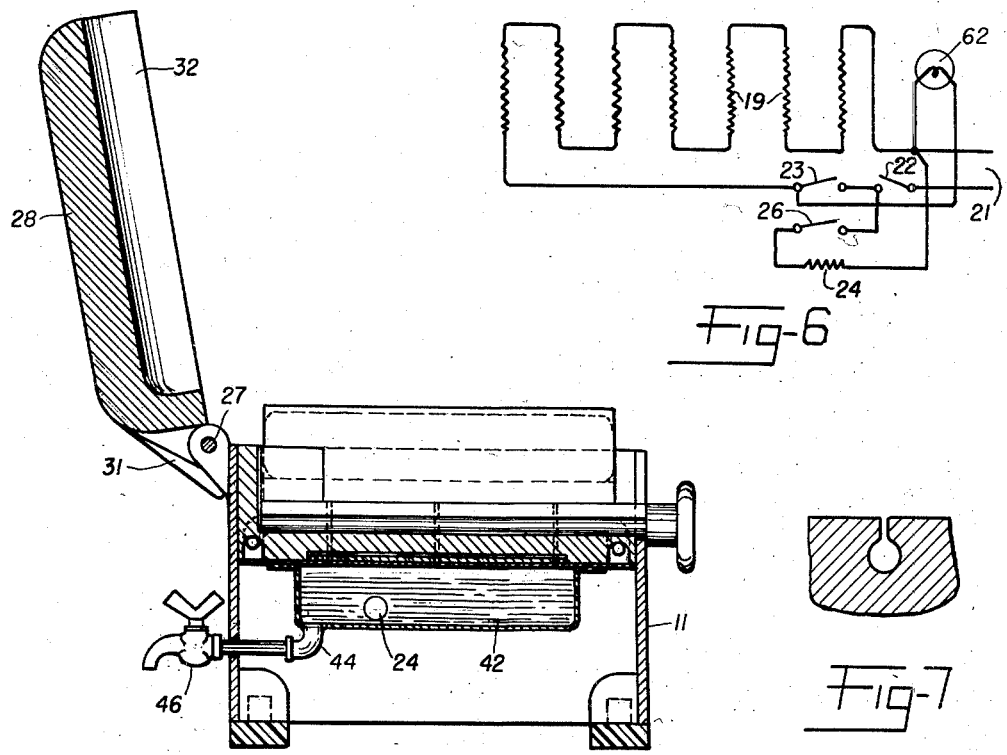
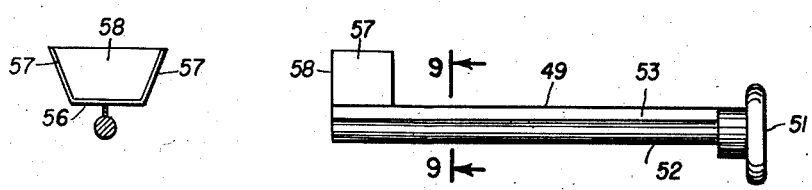
INVENTOR.
FLORENCE E. HOLLAND
BY Louis Casper
Attorney

United States Patent Office 2,804,009
Patented Aug. 27, 1957

2,804,009

FOOD CONTAINER AND DISPENSER

Florence E. Holland, Jamaica, N. Y.

Application June 8, 1956, Serial No. 590,158

5 Claims. (Cl. 99—234)

The present invention relates primarily to food containers and dispensers, and more particularly to a food container and dispenser that may be used in snack bars, lunchrooms, and like places, for storing previously cooked and/or prepared articles for food until such times as they are sold to customers.

One of the objects of the present invention is to provide a food container and dispenser incorporating therein a suitable electrical heating system for maintaining the food in the container at the desired temperature or at the optimum temperature for the particular edible substances contained.

Another object of the invention is to provide a device of the above type that can be placed in full view of a patron and which can be preloaded so that the articles contained therein can be dispensed to customers and patrons without loss of time. In this connection a still further object of the present invention is to provide a dispenser for dispensing edible combinations such as, for example, waffle-wrapped frankfurters, which may be precooked and preassembled and placed in the container and kept in the most desirable condition until such time as they are dispensed to a patron.

Food articles such as waffles have a tendency to dry out if maintained at a warm temperature over an extended period, and it is a still further object of the present invention to provide an arrangement for maintaining the most desirable moisture condition in the container.

A still further object of the present invention is to provide a device of the above type wherein the articles contained therein are maintained at the desired temperature by thermostatically controlled electrical heating means.

Another still further object of the present invention is to provide a device of the above type containing a plurality of edible combinations such as waffle-wrapped frankfurters, and whereby one of the units may be withdrawn at a time from the container without exposing or disturbing the remaining articles.

The above and further objects of the present invention will be more apparent hereinafter in the following detailed description of the preferred embodiment thereof, wherein reference is made to the accompanying drawings, in which:

Fig. 1 is a plan view of the food container and dispenser of the present invention with a part of the top unit thereof broken away;

Fig. 2 is a vertical sectional view taken substantially on line 2—2 of Fig. 1;

Figs. 3 and 4 are enlarged detailed sectional views of certain parts of the dispenser taken substantially on lines 3—3 and 4—4 respectively of Fig. 1;

Fig. 5 is a vertical transverse sectional view taken substantially on line 5—5 of Fig. 1;

Fig. 6 is an electrical circuit diagram of the heating unit for the container;

Fig. 7 is a fragmentary sectional view of a part of the base of the container;

Fig. 8 is an elevational view of a so-called puller for withdrawing a waffle-wrapped frankfurter from the dispenser; and Fig. 9 is a sectional view of the puller taken substantially on line 9—9 of Fig. 8.

Referring now to the drawings, the food container and dispenser of the present invention is adapted for use in snack bars, lunchrooms, etc., where it can be placed in full view of the patron to stimulate sales, and as disclosed herein, is adapted to contain waffle-wrapped frankfurters or the conventional type rolls containing frankfurters, and to maintain the same in the most desirable moist and temperature condition.

As disclosed in the drawings, the device of the present invention has provisions for holding six of the above type articles and obviously the principles of the invention can be applied to containers having facilities for holding a larger or smaller number.

The structure of the present invention includes a rectangular open-ended sheet metal casing 11 which has attached at the lower corners thereof rubber or rubber-like mountings or footings 12.

Secured by screws 13 to the inner top section of the frame casing 11 is a relatively thick member 14 of suitable material. Preferably the plate 14 is a casting and has in the top thereof, as more fully described hereinafter, a series of depressions or grooves 16 with sloping sides 17. The plate 14 also has in the bottom thereof a series of transverse grooves 18 in which are contained suitable electrical heating elements 19. The circuit of the heating elements is shown in Fig. 6, and in the circuit thereof from the power supply 21 is a switch 22 and a thermostat 23. Also operable from the power supply 21 is a water heater 24 in series with a thermostat 26. The circuits to the water heater 24 and the resistance heater 19 are simultaneously completed by the operation of switch 22. The respective thermostats are preferably adjustable and of a conventional type to maintain any desired temperature of the water and of the plate casting 14. A lamp 62 indicates when the switch 22 is closed.

Suitably secured to the rear wall of the casing 11 are a pair of hinge elements 27 whereby the cover 28 is hingedly secured to the casing. The cover 28 is of suitable material and it as well as the plate 14 may, for example, be aluminum castings. The cover 28 has a handle 29 on the front thereof of suitable insulating material whereby the cover can be raised without burning the hands of the attendant, and a cover stop 31 is operable to hold the cover in an open position, such as that shown in Fig. 5. A series of circular grooves 32 are formed in the underside of the cover 28 and extend from the front edge thereof transversely toward the back to a point near the back surface. The grooves 32, when the cover is closed, are in registry or directly above the grooves 16 in the plate 14. The front of the casing 11, as shown in Fig. 5, is notched in positions opposite the grooves 16 so that the full depth of the grooves on the plate 14 are exposed from the front as are the grooves 32 in the cover 28.

In addition to the grooves 19 in the bottom of the plate 14 which contain the resistance elements 19, the bottom of the plate, as best shown in Fig. 4, has a relatively shallow but wide opening or groove 33 formed crosswise thereof and extending substantially the full length of the plate 14. Secured to the bottom of the plate 14 by screws such as 34 is a sheet metal plate 36 which closes the grooves 18 as well as the longitudinal groove 33. Thus the sheet metal plate 36 and the groove 33 form a relatively shallow guideway for a regulator plate 37 which extends out through a suitable opening in the left hand side of the casing 11 and terminates in a handle portion 38.

The sheet metal plate 36 has a series of holes 39 therein which are in registry with vertical holes 41 in the plate casting 14. The upper ends of the holes 41 terminate in the bottom of the groove 16. The regulator plate 37 also has therein a series of holes spaced substantially in the same relative relation as the holes 39 and 41. By positioning the regulator plate 37 in such a position as to align the holes therein with the holes 39 and 41 in the sheet metal plate 36 and casting 14, a continuous passageway from the underside of the plate 36 to the bottom of the groove 16 can be established. By moving the regulator plate 37 varying amounts in the direction of its length by means of the handle 38, the passageway from the underside of the plate to the groove 16 can be progressively decreased or completely shut off. The purpose of the regulating feature will be apparent hereinafter.

Secured to the underside of the plate, which may be effected by the screws 34, is a tank 42 which extends over a substantial part of the bottom area of the casting 14 as indicated in Figs. 2 and 5. The tank 42 is adapted to hold water and is provided with a filler connection 43, Fig. 1, and a drain 44 having a drain cock 46. The water heater element or resistance unit 24 extends into the tank from one side thereof and is adapted to be immersed in the water to heat the same preferably to a temperature that will vaporize or boil the water in the tank.

The steam from the water is permitted to rise through the openings in the sheet metal plate 36, the regulator plate 37 and the holes 41 in the casting 14 to the cavities formed by the grooves 16 and those in the cover. The regulator plate 37, as best shown in Fig. 3, regulates the amount of moisture that is permitted to enter the cavities in the casting 14 and cover 28.

Directly below the groove 16 in the casting plate 14 are a series of horizontal circular holes 47 that are open in the front of the casting. The holes 47 extend substantially the full depth of the casting and are connected to the groove 16 by vertical slots 48.

Adapted to slide in the holes 47 and slots 48 are so-called pullers indicated generally by reference numeral 49, Figs. 8 and 9, whereby the articles of food may be withdrawn, in a manner hereinafter pointed out, from the dispenser without the necessity of opening the cover. The pullers 49 have on the right hand ends thereof, as shown in Fig. 8, circular or other suitably shaped handles 51, and include a rodlike member 52 to the top of which is secured a thin bar 53. The rod 52 and bar 53 are adapted for free movement in the holes 47 and slots 48, respectively. Secured to the rear or left hand ends of the pullers, as shown in Fig. 8, is a tray-shaped unit 54 having a flat bottom section 56, sloping side sections 57, and a vertical end section 58. The tray section 54 is attached to the upper surface of the bar 53 and the shape of the tray conforms substantially to that of the grooves 16 in the plate casting 14.

When the dispenser of the present invention is in use, it being assumed that it is to be loaded with waffle-wrapped frankfurters, for example, the waffles are made and the frankfurters suitably cooked and wrapped therein. The frankfurters 59 and the wrapping waffles 61 are then placed in the groove 16 in the plate casting 14 and the cover 28 closed. It is understood that the pullers 49 are at this time pushed into the casting 14 to the full extent, as indicated in Figs. 1 and 2. The plate casting 14 is maintained at a desired temperature by the electrical heating elements 19 and the waffles 61 are in direct contact with the plate for the major portion thereof and thus maintain the waffles at the desired temperature. The cover 28 absorbs some heat from the plate 14 and thereby keeps the upper sections of the waffle-wrapped frankfurters warm and at the desired temperature.

In order to prevent the waffles or rolls, as the case may be, from drying out while in contact with the heated plate 14, vapor or steam from the tank 42 rising through the described openings or vents maintains the waffles or rolls in the desired condition.

When a customer requests one of the articles contained in the dispenser, the operator merely has to withdraw the puller from the dispenser to withdraw the article therefrom and can immediately hand the same to the customer. Thus there is no other operation required by the operator and a number of customers may be served in rapid succession. The dispenser may be refilled at any time or when the operator of the snack bar has available time and thus is not required to maintain a constant vigilance or supervision of the dispenser.

From the above it can be readily seen that the present invention provides a dispenser for articles of food which enables the operator to quickly and readily serve one or more customers with a plurality of the articles contained, and which can be loaded at the operator's convenience.

It will be obvious that various modifications and changes in the structure of the present invention can be made without departing from the spirit or essential attributes thereof, and it is desired therefore that only such limitations be placed thereon as are imposed by the appended claims.

What is claimed is:

1. In a device of the type described for retaining previously prepared food articles in an edible condition, a plate member having a plurality of food receiving depressions in the upper surface thereof, said depressions being open at one end at the edge of said plate member, a cover member hinged to said plate member on the edge opposite the open ends of said depressions and having cavities in the underside thereof in registry with the depressions of said plate member, said cavities also being open at one end at the edge of said cover member, said open end being in registry with said cover closed, a vertical slot in the lowermost section of each of said depressions, a food article puller associated with each of said depressions in said plate member and guided for horizontal sliding movement in said slots, and means including said food article pullers for slidingly removing food articles from the depressions in said plate member and said cover cavities with said cover in closed position.

2. The combination as set forth in claim 1, and including a water container secured to the underside of said plate member with means for vaporizing said water and vents for vapor passage from said container to said plate member depressions.

3. The combination as set forth in claim 2, and including means for variably restricting the vents from said water container to said plate member depressions.

4. In a food dispenser, a plate member having a plurality of horizontal food article containing grooves in the upper surface thereof, said grooves being of substantially uniform cross-section and open at one edge of said plate member, a cover for said plate member having a like plurality of horizontal grooves in the underside thereof in registry with said plate member grooves, said cover grooves also being of substantially uniform cross-section and open at one edge of said cover above the open ends of said plate member grooves, a horizontal guideway in said plate member adjacent and individual to each of the grooves therein, said guideways including a horizontal circular opening joined to said grooves by vertical slots, an individual puller for each of said grooves adapted for sliding movement in said guideways, said pullers including a rodlike member and a web member for movement in said circular openings and said slots respectively in said plate member, said pullers also being of greater length than said grooves with a handle portion at the outer ends and angularly extending portions at the inner ends extending into said grooves, and means including said pullers for withdrawing food articles from the grooves of said dispenser with said cover in place on said plate member.

5. The combination as set forth in claim 4, and including a water container on the underside of said plate member with vents therefrom to said plate grooves, means for vaporizing said water, a sliding member between said water container and said plate grooves, and means including said sliding member for regulating the movement of water vapor from said container through said vents to said plate grooves.

References Cited in the file of this patent
UNITED STATES PATENTS

| | | |
|---|---|---|
| 1,870,735 | Jones et al. | Aug. 9, 1932 |
| 2,044,615 | Kennedy | June 16, 1936 |
| 2,622,186 | Hutchens | Dec. 16, 1952 |
| 2,674,935 | Lewis et al. | Apr. 13, 1954 |